(12) United States Patent
Grothe

(10) Patent No.: US 8,917,244 B2
(45) Date of Patent: Dec. 23, 2014

(54) STIMULI SENSITIVE DISPLAY SCREEN WITH MULTIPLE DETECT MODES

(75) Inventor: Steven P. Grothe, Cave Creek, AZ (US)

(73) Assignee: Honeywell International Inc., Morristown, NJ (US)

( * ) Notice: Subject to any disclaimer, the term of this patent is extended or adjusted under 35 U.S.C. 154(b) by 1242 days.

(21) Appl. No.: 11/760,915

(22) Filed: Jun. 11, 2007

(65) Prior Publication Data

US 2008/0303797 A1    Dec. 11, 2008

(51) Int. Cl.
    *G06F 3/041*    (2006.01)
    *G09G 5/00*    (2006.01)
    *G06F 3/01*    (2006.01)

(52) U.S. Cl.
    CPC .............. *G06F 3/016* (2013.01); *G06F 3/041* (2013.01); *G06F 3/0414* (2013.01); *G06F 3/0416* (2013.01)
    USPC .......................................... 345/173; 345/156

(58) Field of Classification Search
    CPC ........................... G06F 3/016; G06F 2203/014
    USPC ................. 345/156–183; 178/18.01–20.04
    See application file for complete search history.

(56) References Cited

U.S. PATENT DOCUMENTS

| | | | | |
|---|---|---|---|---|
| 5,053,585 | A * | 10/1991 | Yaniger | 178/18.05 |
| 5,162,618 | A * | 11/1992 | Knowles | 178/18.04 |
| 5,402,151 | A * | 3/1995 | Duwaer | 345/173 |
| 6,492,979 | B1 | 12/2002 | Kent et al. | |
| 6,822,635 | B2 | 11/2004 | Shahoian et al. | |
| 7,053,967 | B2 | 5/2006 | Abileah et al. | |
| 7,113,177 | B2 * | 9/2006 | Franzen | 345/173 |
| 7,148,875 | B2 | 12/2006 | Rosenberg et al. | |
| 7,324,093 | B1 * | 1/2008 | Gettemy et al. | 345/173 |
| 7,552,402 | B2 * | 6/2009 | Bilow | 715/862 |
| 8,369,887 | B2 * | 2/2013 | Choe et al. | 455/550.1 |
| 2001/0013855 | A1 * | 8/2001 | Fricker et al. | 345/156 |
| 2002/0196238 | A1 * | 12/2002 | Tsukada et al. | 345/173 |
| 2003/0058265 | A1 * | 3/2003 | Robinson et al. | 345/701 |
| 2003/0122779 | A1 * | 7/2003 | Martin et al. | 345/156 |
| 2004/0090429 | A1 * | 5/2004 | Geaghan et al. | 345/173 |
| 2005/0110766 | A1 * | 5/2005 | Kent et al. | 345/173 |
| 2005/0151720 | A1 * | 7/2005 | Cruz-Hernandez et al. | 345/156 |
| 2005/0156892 | A1 * | 7/2005 | Grant | 345/167 |
| 2005/0162408 | A1 * | 7/2005 | Martchovsky | 345/173 |

(Continued)

FOREIGN PATENT DOCUMENTS

| | | |
|---|---|---|
| WO | 2006040750 A1 | 4/2006 |
| WO | 2006042309 A1 | 4/2006 |

(Continued)

OTHER PUBLICATIONS

European Patent Office, European Office Action for Application No. 08 157 901.3-1527 dated Oct. 26, 2012.

(Continued)

*Primary Examiner* — Patrick F Marinelli

(74) *Attorney, Agent, or Firm* — Ingrassia Fisher & Lorenz, P.C.

(57) ABSTRACT

According to an example embodiment a display screen includes a first sensor array that is operable to detect a first external stimulus that meets a first detection criteria, and a second sensor array that is operable to detect a second external stimulus that meets a second detection criteria, the second detection criteria quantitatively different from the first detection criteria.

3 Claims, 6 Drawing Sheets

(56) References Cited

U.S. PATENT DOCUMENTS

| | | |
|---|---|---|
| 2006/0017708 A1* | 1/2006 | Fukui et al. ............. 345/173 |
| 2006/0125971 A1* | 6/2006 | Abileah et al. ............ 349/42 |
| 2006/0146037 A1 | 7/2006 | Prados et al. |
| 2006/0161870 A1* | 7/2006 | Hotelling et al. .......... 715/863 |
| 2006/0232559 A1* | 10/2006 | Chien et al. ............. 345/168 |
| 2006/0244733 A1* | 11/2006 | Geaghan ................. 345/173 |
| 2006/0279548 A1* | 12/2006 | Geaghan ................. 345/173 |
| 2007/0062739 A1* | 3/2007 | Philipp et al. .......... 178/18.06 |
| 2007/0085837 A1* | 4/2007 | Ricks et al. ............. 345/173 |
| 2007/0176906 A1* | 8/2007 | Warren .................. 345/173 |
| 2007/0236474 A1* | 10/2007 | Ramstein ............... 345/173 |
| 2008/0231605 A1* | 9/2008 | Yang .................... 345/173 |
| 2009/0225043 A1* | 9/2009 | Rosener ................. 345/173 |

FOREIGN PATENT DOCUMENTS

| | | |
|---|---|---|
| WO | 2006115946 A2 | 11/2006 |
| WO | 2006115946 A3 | 11/2006 |
| WO | 2007057266 A1 | 5/2007 |

OTHER PUBLICATIONS

EP search report, EP 08157901.3-1527/2003537 dated May 31, 2012.

* cited by examiner

STIMULI SENSITIVE DISPLAY SCREEN WITH MULTIPLE DETECT MODES

BACKGROUND

1. Technical Field

This disclosure relates generally to the interfacing with computer and mechanical devices by a user, and more particularly to devices used to interface with computer systems and electronic devices.

2. Description of the Related Art

Humans interface with electronic and mechanical devices in a variety of applications, and the need for a more natural, easy-to-use, and informative interface is a constant concern. One type of device that humans use to interface with electronic and mechanical devices is a touch-sensitive display screen, or "touchscreen."

Conventional touchscreens have a single detection mode—that is, a touching of the touchscreen is detected using a mechanism that operates in accordance with a single physical principle. For example, some conventional touchscreens are implemented using a capacitive touchscreen array, while other conventional touchscreens are implemented using a resistive touchscreen array.

Regardless of the particular method that is used to detect a touching of the touchscreen, multiple touches are sometimes required in the same area of the touchscreen in order to select a function, to activate a function, or to manipulate a function. Over a relatively small amount of time, this may not seem like an overly burdensome task. However, over the course of many hours and/or many hundreds of function selections, the multiple touchings that may be required for each function selection, activation, or manipulation may become burdensome to the user. Example embodiments address these as well as other concerns associated with the related art.

SUMMARY

According to an example embodiment, a display screen includes a first sensor array that is operable to detect a first external stimulus that meets a first detection criteria, and a second sensor array that is operable to detect a second external stimulus that meets a second detection criteria, the second detection criteria quantitatively different from the first detection criteria.

According to an example embodiment, a method includes the steps of detecting a first stimulus in a region of a display screen using a first sensor array of the display screen, and detecting a second stimulus in the region of the display screen using a second sensor array of the display screen.

According to an example embodiment, a display system includes a processor and a substantially planar display screen that is coupled to the processor. The display system further includes a first sensor network coupled to the processor that is operable to detect an object that impinges a first plane that is substantially parallel to the display screen. The display system further includes a second sensor network coupled to the processor that is operable to detect an object the impinges a second plane that is substantially parallel to the display screen.

BRIEF DESCRIPTION OF THE DRAWINGS

Example embodiments are described with reference to the following drawings, where like numerals refer to like elements throughout. Furthermore, well-known features that are not necessary for an understanding of the example embodiments are not shown in the drawings in order to increase clarity. In order to emphasize certain features, the drawings may not be to scale.

DETAILED DESCRIPTION

Figure 1:
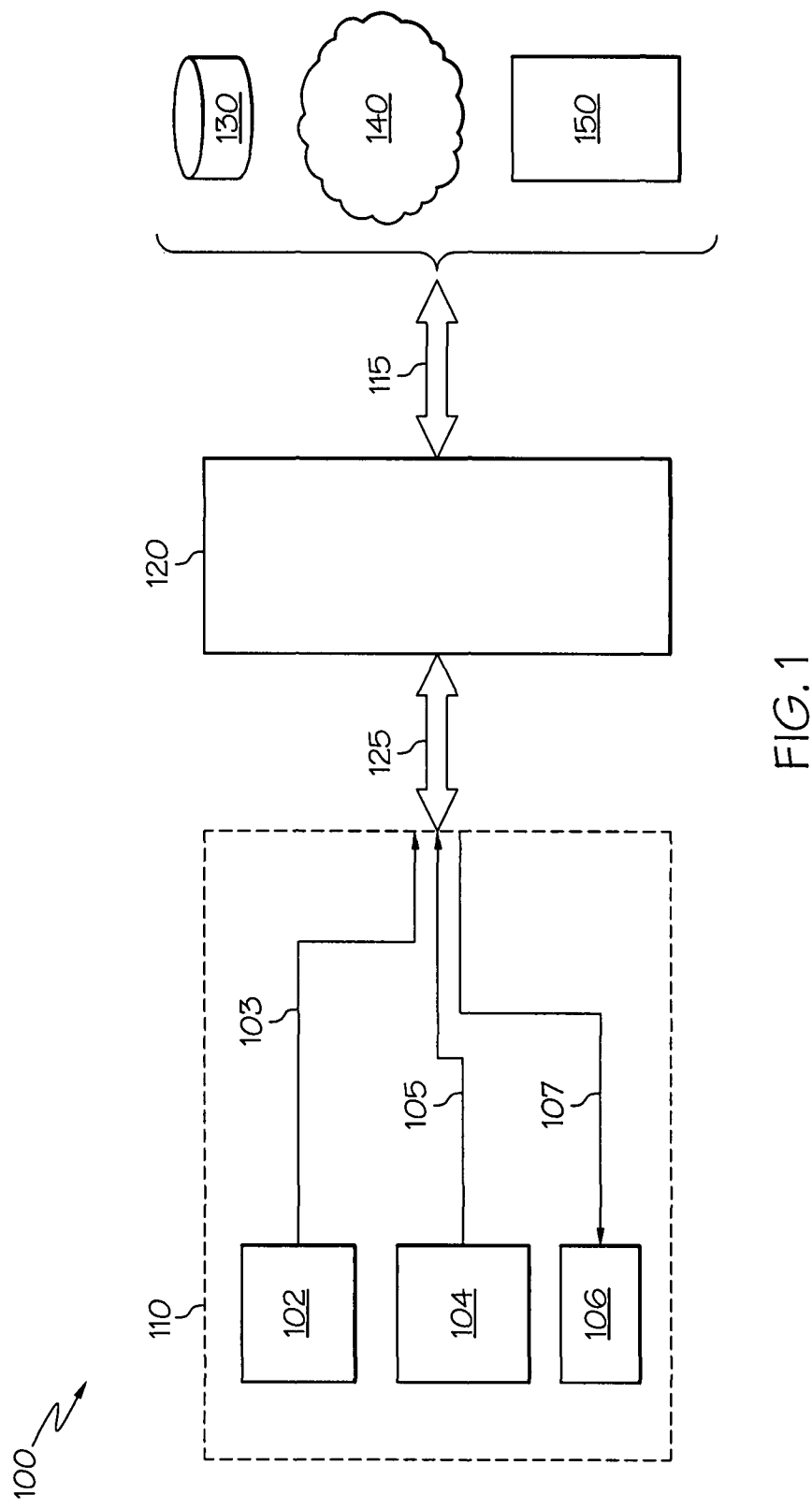
FIG. 1 is a conceptual block diagram illustrating a system including a SSDS with multiple detection modes in accordance with an example embodiment.

Display screens are widely used for the monitoring and control of mobile or stationary land-based, water-based, and space-based systems that include, but are not limited to, security systems, entertainment systems, communication systems, control systems, power management systems, and tracking systems such as an air traffic control systems. For purposes of this disclosure, a Stimuli-Sensitive Display Screen (SSDS) is defined as a display screen that is capable of outputting visual data and capable of generating a signal in response to a physical manipulation of the display screen or the environment surrounding the display screen. For example, a SSDS includes, but is not limited to, a touch-sensitive display screen that generates a signal in response to a physical touching of a region of the display screen, a proximity-sensitive display screen that generates a signal in response to an object being in proximity to, but not physically touching, a region of the display screen, or a light-sensitive display screen that generates a signal in response to optical radiation striking a region of the display screen.

To address disadvantages associated with the related art, it would be desirable to have a SSDS with multiple detection modes. For example, it would be beneficial to have a touch-screen that is capable of distinguishing between a light touch and a heavy touch, where the heavy touch is applied with a relatively greater pressure than the light touch. Accordingly, some example embodiments include touchscreens with multiple detection modes, systems that include touchscreens with multiple detection modes, and methods of detecting quantitatively different touches using a touchscreen.

According to some example embodiments, a SSDS includes at least two sensor arrays. For purposes of this disclosure, a sensor array is defined as at least one sensor element, where each of the at least one sensor elements are operable to detect a stimulus using substantially the same detection criteria.

According to some embodiments, the sensor arrays may all be of the same type. For example, the sensor arrays may all be touch-sensitive, proximity-sensitive, or light-sensitive arrays. According to some other embodiments, the sensor arrays may be of different types. For example, the sensor arrays may include any combination of touch-sensitive, proximity-sensitive, and light-sensitive arrays.

For example, a touchscreen according to one embodiment may be able to distinguish between a light touch and a heavy touch, which can be advantageously used to select and activate a function. In other words, the touchscreen may operate to select a function in response to detecting a light touch, whereas the touchscreen may operate to activate a function in response to detecting a heavy touch that is applied with more pressure than the light touch.

As another example, a SSDS according to another embodiment may be both touch-sensitive and proximity-sensitive. Similar to the touchscreen embodiment described above, the touch inputs that are sensed by the SSDS may be used for a different purpose than the proximity inputs that are sensed by the SSDS. For example, the SSDS may operate to select a function in response to detecting a proximity input, whereas the SSDS may operate to activate a function in response to detecting a touch input.

FIG. 1 is a conceptual block diagram illustrating a system 100 including a SSDS 110 with multiple detection modes in accordance with an example embodiment. The system 100 suitably includes a SSDS 110 and a processor 120. The SSDS 110 suitably includes a first sensor array 102, a second sensor array 104, and a display element 106.

The display element 106 may be part of a number of different display devices that generate visual output using any one of a number of technologies. For example, the display element 106 may be part of, but is not limited to, a color Cathode Ray Tube (CRT) display device, a monochromatic CRT display device, a flat panel display device, a Liquid Crystal Display (LCD) device, a plasma display device, an electro-luminescent display device, a Light Emitting Diode (LED) display device, a holographic display device such as a Head Up Display (HUD), a Micro Mirror Device (MMD) display device, or the like.

The processor 120 is communicatively coupled to the SSDS 110 via interface 125. The processor 120 is operable to control the display element 106 in order to generate one or more displays rendered as visual output on areas of the display element. The processor 120 preferably encompasses one or more functional blocks and can include any number of individual microprocessors, memories, storage devices, interface cards, or other processor components.

The processor 120 may be coupled, via interface 115, with one or more of a number of conventional system components, such as a storage device 130, a network 140, or another processor 150. The storage device 130 may be, for example, a memory such as a floppy disk, hard disk drive, a DVD-ROM drive, or an optical storage medium. The network 140 may be, for example, a Local Area Network (LAN). The processor 150 may be, for example, a processor for controlling an aircraft system, such as the environmental system that regulates the passenger cabin's pressure and temperature.

As indicated above, the processor 120 is operable to control the display element 106 in order to generate one or more displays on the display element. Thus, the processor 120 and SSDS 110 are coupled such that the display element 106 receives control signals 107 from the processor.

The first sensor array 102 is operable to generate a first signal 103 in response to a detection of a physical manipulation of the SSDS 110 or the environment surrounding the SSDS. The second sensor array 104 is operable to generate a second signal 105 in response to a detection of a physical manipulation of the SSDS 110 or the environment surrounding the SSDS. Furthermore, according to example embodiments the first sensor array 102 is capable of generating the first signal 103 in response to a first detection criteria being fulfilled and the second sensor array 104 is capable of generating the second signal 105 in response to a second detection criteria being fulfilled. These signals 103, 105 are sent as input to the processor 120, via the interface 125.

According to example embodiments, the first and second detection criteria are quantitatively different from one another. For instance, according to some embodiments the first detection criteria may be fulfilled when a user of the SSDS 110 touches the first sensor array 102 using a touch that exceeds a first threshold pressure level, while the second detection criteria may be fulfilled when a user of the SSDS touches the second sensor array 104 using a touch that exceeds a second threshold pressure level that is greater than the first threshold pressure level. According to some other embodiments, the first detection criteria may be fulfilled when a user of the SSDS 110 touches the first sensor array 102 using a touch that exceeds a first threshold pressure level, while the second detection criteria may be fulfilled when an object approaches within a predetermined distance of the second sensor array 104. According to still other embodiments, the first detection criteria may be fulfilled when a user of the SSDS 110 touches the first sensor array 102 using a touch that exceeds a first threshold pressure level, while the second detection criteria may be fulfilled when optical radiation of a particular wavelength or intensity strikes a region of the second sensor array 104.

According to still other example embodiments, the SSDS 110 may be operable to generate signals in response to more than two quantitatively different detection criteria being fulfilled. That is, there may be three or more different sensor arrays, each one operable to generate a signal in response to a different detection criteria.

According to an example embodiment, both the first and second detection criteria remain substantially constant throughout the region where the first and second sensor arrays 102, 104 are effective in detecting a physical manipulation of the SSDS 110 or the environment surrounding the SSDS. For instance, if the first sensor array 102 and the second sensor array 104 are touch-sensitive arrays, the first threshold pressure level and the second threshold pressure level associated with the example embodiments described above remain substantially the same regardless of what particular region of the first sensor array 102 or the second sensor array 104 is touched.

Furthermore, while according to some example embodiments first and second detection criteria are quantitatively different from one another, a geographic separation between detected locations of physical manipulations is not considered a quantitative difference between detection criteria. For example, a touch in a first area of the first sensor array 102 that exceeds a first threshold pressure level is not quantitatively different from a touch in a second area of the first sensor array that exceeds the first threshold pressure level merely because the touches are detected in different areas (or detected using different sensor elements) of the first sensor array. Thus, according to an example embodiment a difference between the first and the second detection criteria is related to a quantitative difference in the manner in which a physical manipulation is detected, and not related to a separation between regions of the first sensor array 102 where the physical manipulations are detected.

Figure 2:
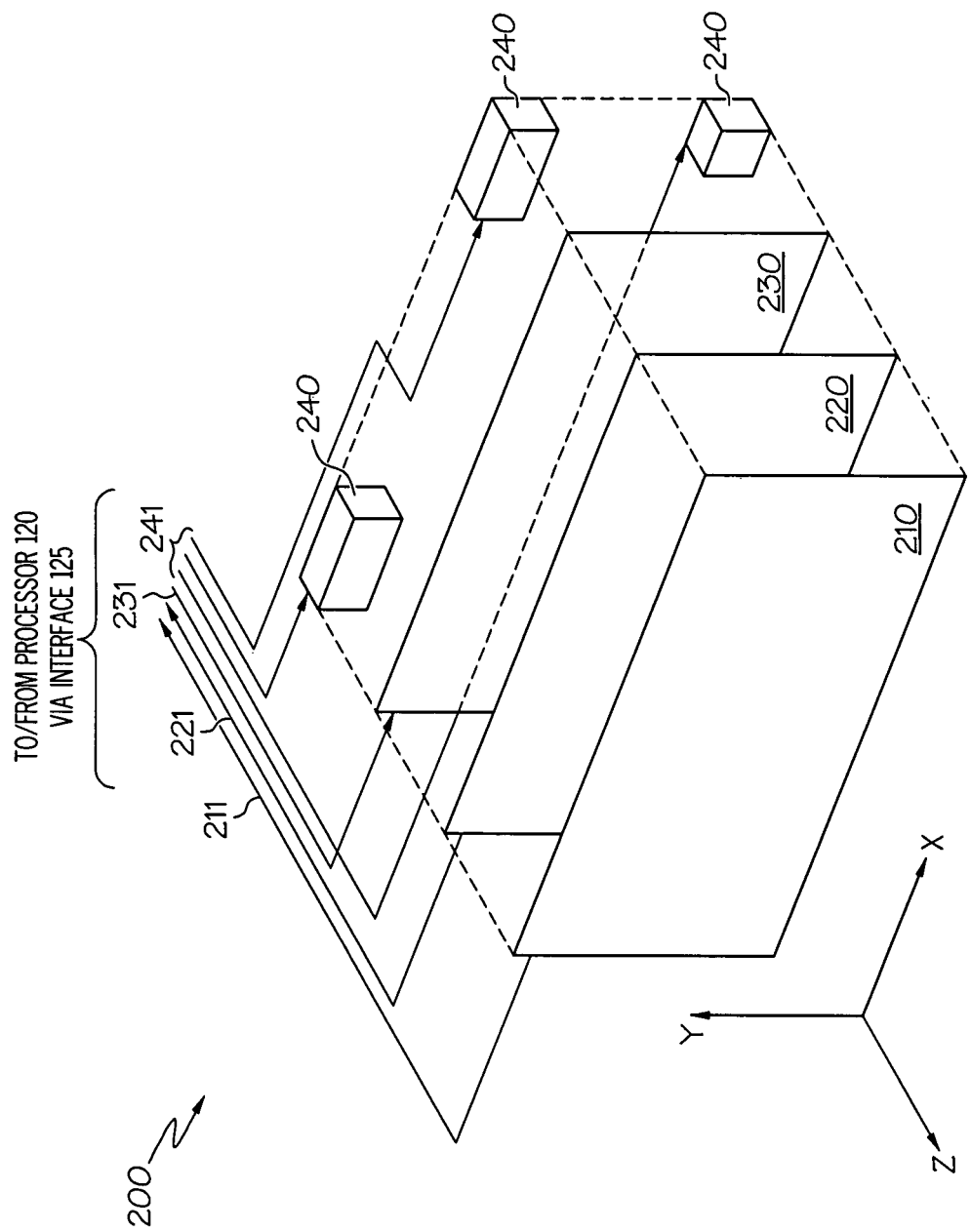
FIG. 2 is a conceptual block diagram illustrating a SSDS with multiple detection modes in accordance with some example embodiments.

FIG. 2 is a conceptual block diagram illustrating a SSDS 200 with multiple detection modes in accordance with some example embodiments. The SSDS 200 may be used as the SSDS 110 of FIG. 1. The SSDS 200 suitably includes a first sensor array 210, a second sensor array 220, a display element 230, and haptic feedback devices 240. The haptic feedback devices 240 may be, for instance, linear actuators that are arranged to apply a force to the display element 230 in the z direction. The sensor arrays 210, 220 and the display element 230 are substantially planar and are arranged substantially perpendicular to the z-axis. The first sensor array 210 is nearer the front of the SSDS 200 than the display element 230. That is, an observer standing on the positive z axis, looking in the negative z direction, would be closest to the first sensor array 210.

For clarity, FIG. 2 illustrates that a physical separation in the z direction exists between the display element 230, the sensor arrays 210, 220 and the haptic feedback devices 240. However, FIG. 2 is not drawn to scale and in reality the physical separation may be very small or even nonexistent. For example, the haptic feedback devices 240 may be in contact with the display element 230. In some embodiments, the sensor arrays 210, 220, and display element 230 may be in contact with one another. In some other embodiments, elements of the sensor array 210 may occupy substantially the same plane as elements of the sensor array 220. Thus, the sensor array 210 and the sensor array 220 may be disposed in substantially the same plane. Furthermore, while FIG. 2 shows that the sensor array 210 is front-most in the SSDS 200, in alternative embodiments the sensor array 220 may be in front of the sensor array 210, or both the sensor arrays 210, 220 may be disposed behind the display element 230.

FIG. 2 illustrates that the haptic feedback devices 240 are arranged to deliver haptic feedback to the four corners of the display element 230 (one of the haptic feedback devices 240 is obscured), but in other embodiments the haptic feedback devices 240 may be disposed in different locations relative to the sensor arrays 210, 220 and the display element 230. For example, in another embodiment the haptic feedback devices 240 may be arranged to apply a haptic feedback to another element of the SSDS 200, such as a housing (not shown) that holds the sensor arrays 210, 220 and display element 230 in place. In that case, the haptic feedback applied to the housing could be detected by a user who is touching the sensor array 210, which is held by the housing.

According to example embodiments, the first sensor array 210 is operable to detect a physical manipulation of the SSDS 200 or the environment surrounding the SSDS that exceeds a first detection criteria. According to example embodiments, the second sensor array 220 is operable to detect a physical manipulation of the SSDS 200 or the environment surrounding the SSDS that exceeds a second detection criteria, where the second detection criteria is quantitatively different from the first detection criteria. The first sensor array 210 is operable to generate a first signal 211 in response to the first detection criteria being fulfilled, and second sensor array 220 is operable to generate a second signal 221 in response to the second detection criteria being fulfilled. The first signal 211 and the second signal 221 are sent to the processor 120 via the interface 125. The display element 230 is operable to receive a control signal 231 from the processor 120 via the interface 125, which causes the display element to generate one or more displays rendered as visual output on a display area of the display element.

According to some example embodiments, the first sensor array 210 and the second sensor array 220 are of the same type. For example, the sensor arrays 210, 220 may both be touch-sensitive arrays. In other example embodiments, the sensor arrays 210, 220 may both be proximity-sensitive arrays, or they may both be light-sensitive arrays.

According to some other embodiments, the sensor arrays 210, 220 may be of different types. For example, sensor array 210 may be light-sensitive and sensor array 220 may be touch-sensitive. As another example, sensor array 210 may be proximity sensitive and sensor array 220 may be touch-sensitive.

The haptic feedback devices 240 are operable to receive haptic feedback control signals 241 from the processor 120 via the interface 125, and to provide force feedback or tactile feedback to a user who is touching the SSDS 200. U.S. Pat. No. 7,148,875 to Rosenberg et al., which is incorporated by reference, discloses a method of haptic feedback for a touchpad and other touch controls.

According to a preferred embodiment, the first and second sensor arrays 210, 220 are touch-sensitive. In this embodiment, the processor 120 is operable to control the haptic feedback devices 240 to provide a first feedback scheme after the first signal 211 is received by the processor. Likewise, the processor 120 is operable to control the haptic feedback devices 240 to provide a second feedback scheme after the second signal 221 is received by the processor. For example, the first feedback scheme may be a single "pulse" that can be felt by the user, while the second feedback scheme may be two or more pulses that are delivered in relatively quick succession.

According to alternative embodiments, the haptic feedback devices 240 may be absent. This may be the case, for example, in embodiments where neither one of the first and second sensor arrays 210, 220 are touch-sensitive and the user is not required to touch the SSDS 200 in order to provide inputs. In other embodiments, haptic feedback may not be desired due to cost constraints.

Figure 3:
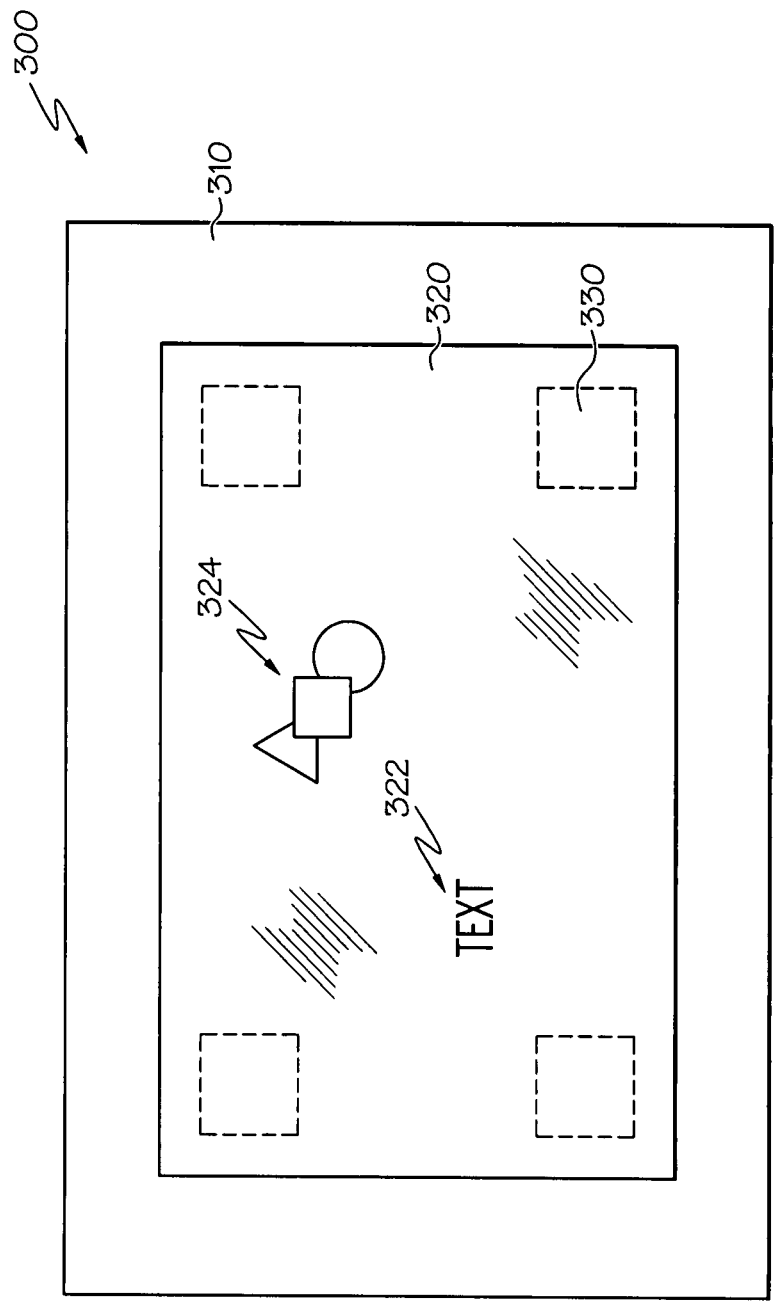
FIG. 3 is a top plan diagram illustrating a SSDS with multiple detection modes in accordance with an example embodiment.
Figure 4:
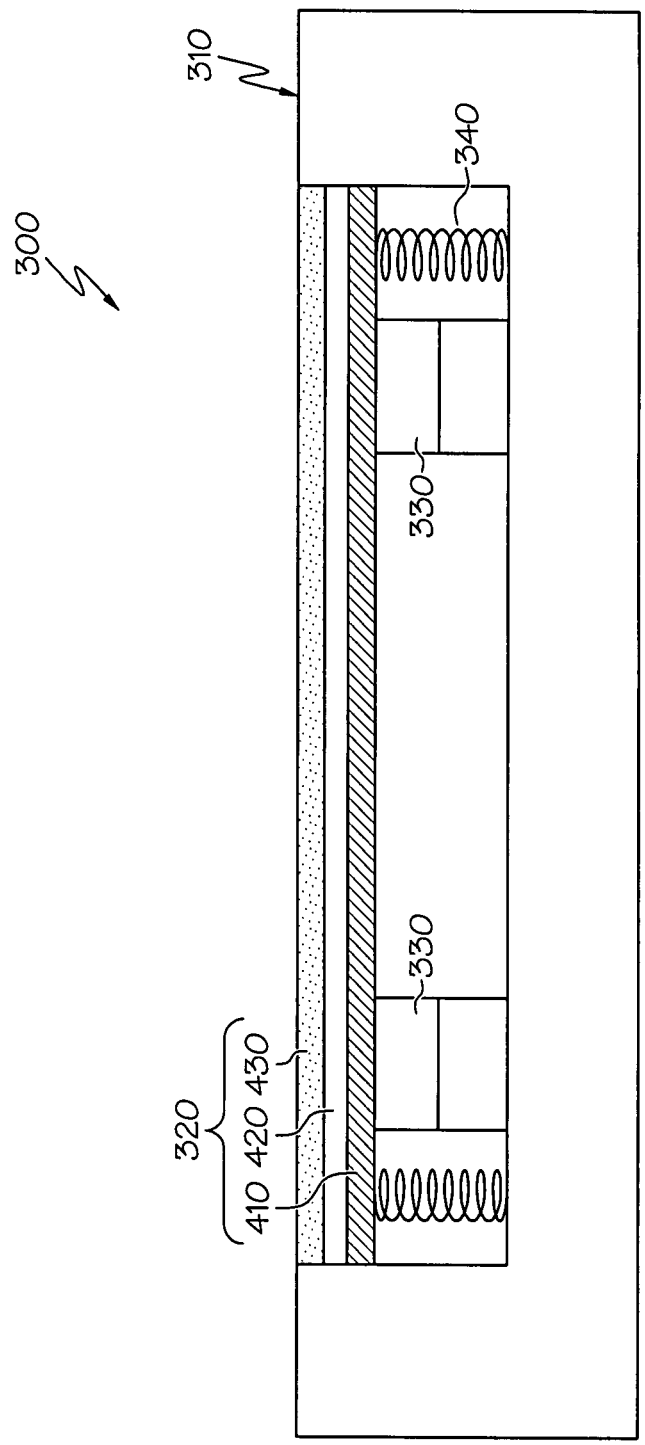
FIG. 4 is a sectional diagram that further illustrates the SSDS of FIG. 3.

FIG. 3 is a plan diagram illustrating a SSDS 300 with multiple detection modes in accordance with an example embodiment. FIG. 4 is a sectional diagram that further illustrates the SSDS 300 of FIG. 3.

Referring to FIGS. 3 and 4, the SSDS 300 suitably includes a housing 310, a screen 320, actuators 330 coupled to the underside of the screen 320, and springs or compliant elements 340, such as helical springs, leaf springs, flexures, or compliant material (foam, rubber, etc.). Referring to FIG. 4, the screen 320 includes a capacitive sensor array 430, a resistive sensor array 420, and a display element 410.

The display element 410 of the screen 320 is operable to display either text 322 or symbols 324 in response to control signals sent from a controller, for instance, the processor 120 of FIG. 1. The capacitive sensor array 430 and the resistive sensor array 420 are transparent films that are overlaid on the display element 410. The capacitive sensor array 430 is operable to generate a signal, for example, the signal 103 of FIG. 1, when the capacitive sensor array 430 is touched. The resistive sensor array 420 is also operable to generate a signal, for example, the signal 105 of FIG. 1, when the resistive sensor array 420 is touched. Preferably, the capacitive sensor array 430 may detect lighter touches than the resistive sensor array 420. Further technical details regarding capacitive sensor arrays and resistive sensor arrays may be found elsewhere in the literature and are not required for an understanding of example embodiments. In addition to resistive sensor arrays and capacitive sensor arrays, example embodiments may use sensor arrays that are implemented by any other known technology, such as surface acoustic waves.

According to the embodiments illustrated in FIGS. 3 and 4, the difference in sensitivity between the capacitive sensor array 430 and the resistive sensor array 420 may be advantageously used to reduce the workload for a user. In a single touch, the user can first trigger the capacitive sensor array 430, then without removing the finger or a stylus from the display screen 320, apply additional pressure that is sufficient to trigger the resistive sensor array 420. Therefore, in a single touch, the user may cause both the capacitive sensor array 430 and the resistive sensor array 420 to generate a signal.

According to these embodiments, each signal that is generated by the capacitive sensor array 430 and the resistive sensor array 420 may cause a different action to occur. For example, a signal generated by the capacitive sensor array 430 may result in the visual output that is displayed in the corresponding region of the display element 410 to be selected as the display of interest. Subsequently, a signal generated by the resistive sensor array 420 may cause the display of interest to be further manipulated in any number of predetermined ways. For instance, in response to the signal generated by the resistive sensor array 420, the display of interest may be expanded or contracted, a drop-down menu related to the display of interest may appear, a data entry function for the display of interest may appear, a cursor displayed within the display of interest may be moved, etc.

The actuators 330, as explained above, are coupled to the underside of the screen 320, and are operable to provide haptic feedback such as pulses, vibrations, and textures to the screen 320. In FIG. 3, the actuators 330 are positioned near each corner of the screen 320, but other configurations for the actuators may also be used. The actuators 330 may be piezoelectric actuators, voice-coil actuators, or any other suitable type of actuator that is known in the art. The screen 320 is coupled to the housing 310 by the compliant elements 340, which allow the screen to move approximately along the z-axis. In other embodiments, the housing, screen, actuators, and compliant elements may be arranged such that the screen is capable of moving approximately along the x-axis, the y-axis, or both.

According to some example embodiments, the actuators 330 are operable to provide a first type of haptic feedback in response to a signal from the capacitive sensor array 430, and a second type of haptic feedback in response to a signal from the resistive sensor array 420. For example, the actuators 330 may vibrate the screen 320 relatively lightly for a relatively long duration in response to a signal from the capacitive sensor array 430, while the actuators 330 may vibrate the screen relatively vigorously in a series of relatively short pulses in response to a signal from the resistive sensor array 420.

Comparing SSDS 300 to SSDS 200, it should be apparent that the SSDS 300 is a specific example of the embodiments represented by SSDS 200, where the first sensor array 210 corresponds to the capacitive sensor array 430, the second sensor array 220 corresponds to the resistive sensor array 420, the display element 230 corresponds to the display element 410, and the haptic feedback devices 240 correspond to the actuators 330.

However, while SSDS 300 includes a capacitive sensor array 430 and a resistive sensor array 420 that are both touch-sensitive, other example embodiments are not so limited. As was explained above, in some example embodiments there may be more than two sensor arrays, and other example embodiments may have sensor arrays that are of different types. For example, some embodiments may have a touch-sensitive sensor array and a proximity-sensitive sensor array, or a touch-sensitive sensor array and a light-sensitive sensor array. According to example embodiments, there may be at least two sensor arrays in a SSDS. Furthermore, according to example embodiments, two or more of the sensor arrays are operable to detect a physical manipulation of the SSDS or an object proximate to the SSDS using quantitatively different detection criteria.

One example of a proximity-sensitive array suitable for use with example embodiments is an InfraRed (IR) sensor array, where a series of IR emitters arranged in the x-direction and a series of IR emitters arranged in the y-direction are operable to emit IR radiation into corresponding IR detectors that are arranged to receive the radiation. When an object blocks the IR radiation that would otherwise enter a detector, the position of the object may be correlated to an underlying display screen based upon the x and y locations of the detectors that are no longer receiving IR radiation. Further details regarding the IR array and other proximity-sensitive arrays suitable for use with example embodiments may be found elsewhere in the literature, and are omitted here for brevity. Likewise, further details regarding known light-sensitive arrays suitable for use with example embodiments are also omitted, but one example is described in U.S. Pat. No. 7,053,967 to Abileah et al., which is incorporated by reference.

Figure 5:
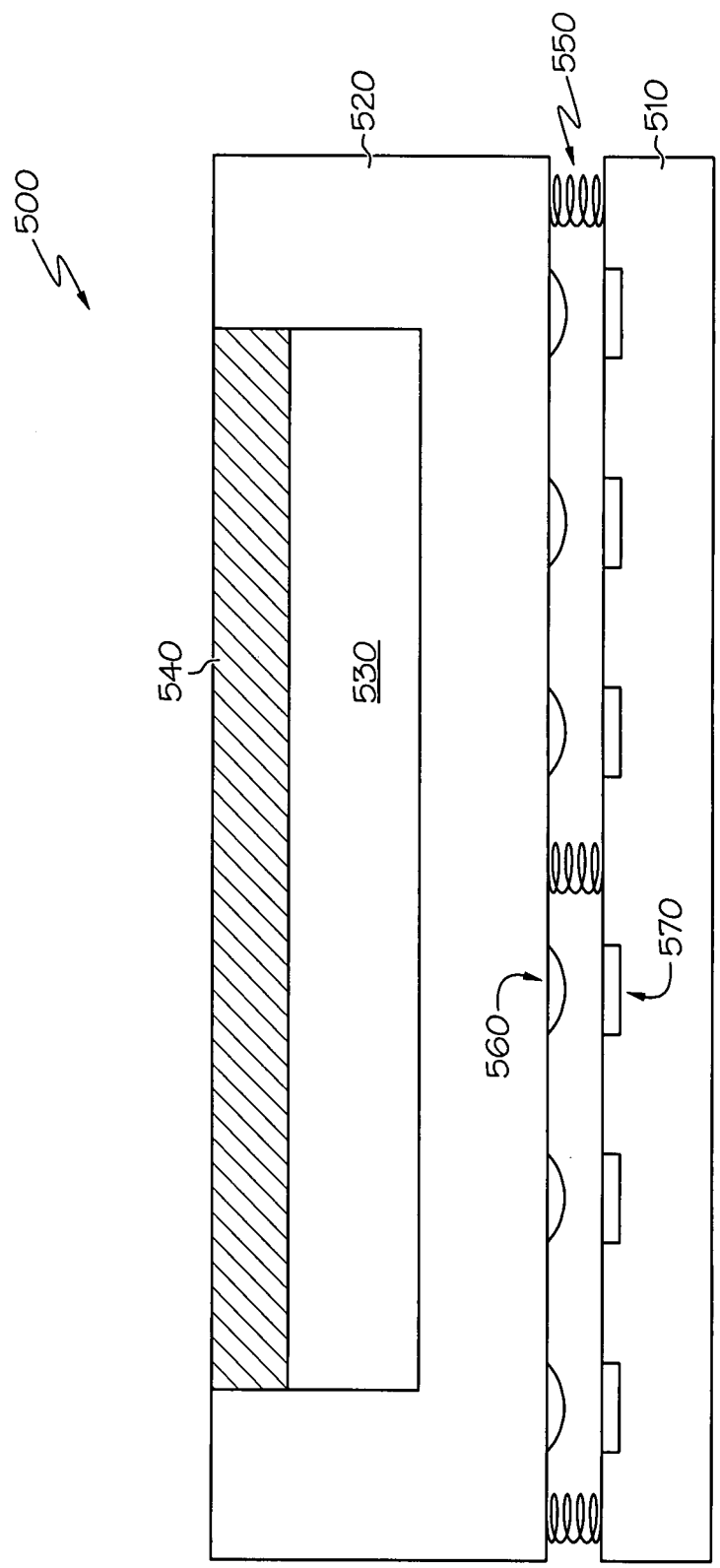
FIG. 5 is a sectional diagram illustrating a SSDS with multiple detection modes in accordance with another example embodiment.

FIG. 5 is a sectional diagram illustrating a SSDS 500 with multiple detection modes in accordance with another example embodiment. SSDS 500 suitably includes a display element 530 and a resistive sensor array 540. The SSDS 500 further includes an upper housing 520, which holds the display element 530 and the resistive sensor array 540, and a lower housing 510. The SSDS 500 further includes helical springs 550, upper switch contacts 560, and lower switch contacts 570.

The display element 530 is operable to display either text or symbols in response to control signals sent from a controller, for instance, the processor 120 of FIG. 1. The resistive sensor array 540 is a transparent film that is overlaid on the display element 530.

The helical springs 550 are connected between the upper housing 520 and the lower housing 510. The helical springs 550 are operable to compress when a force is applied to the upper housing 520, such as when a user touches the resistive sensor array 540. If the force applied to the upper housing 520 is great enough, one or more of the upper switch contacts 560 will contact a corresponding one of the lower switch contacts 570. The combination of the helical springs 550, the upper switch contacts 560, and the lower switch contacts 570 function as a switching mechanism, and the activation of this switching mechanism may be used to generate a signal. Thus, the resistive sensor array 540 may be considered the first sensor array 102 of the SSDS 110 of FIG. 1, while the helical springs 550, the upper switch contacts 560, and the lower switch contacts 570, may be considered as implementing the second sensor array 104 of the SSDS 110.

In alternative embodiments, there may only be one upper switch contact 560 and a corresponding lower switch contact 570. However, in order to obtain a switching mechanism that is triggered by substantially the same amount of force irregardless of where the upper surface of the resistive sensor element 540 is touched, it is desirable to use multiple upper and lower switch contacts, as illustrated. For the same reasons, it would be beneficial to use helical springs 550 that have a substantially equal size and spring constant, and it would also be desirable to arrange the helical springs 550, the upper contacts 560, and the lower contacts 570 such that they are evenly distributed in the area between the upper housing 520 and the lower housing 510.

Many other mechanical and electrical switching mechanisms are known in the art. While a description of the other switching mechanisms that could be used with example embodiments is omitted for the sake of brevity, it is contemplated that one of ordinary skill, armed with the teachings found in this disclosure, might easily come up with ways to utilize other known switching mechanisms to implement a second sensor array in keeping with an example embodiment.

Figure 6:
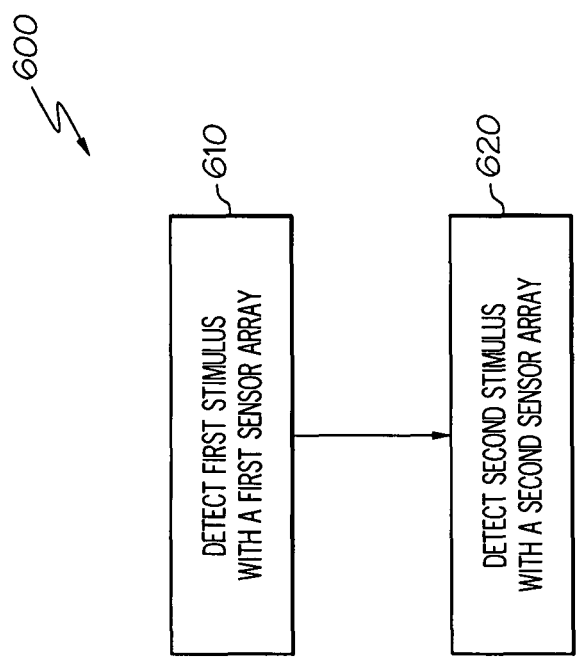
FIG. 6 is a flow diagram illustrating some processes included in a method according to an example embodiment.

FIG. 6 is a flow diagram illustrating some processes included in a method 600 according to some example embodiments. The example embodiments include two processes 610, 620. Process 610 involves detecting a first stimulus with a first sensor array of a SSDS, while process 620 involves detecting a second stimulus with a second sensor array of the SSDS.

According to the example embodiments, the first and second sensor arrays are operable to detect first and second stimuli that are quantitatively different. For example, the first sensor array may be operable to detect a physical touching of the SSDS that exceeds a first threshold pressure, while the second sensor array may be operable to detect a physical touching of the SSDS that exceeds a second threshold pressure that is greater than the first threshold pressure. In another example embodiment, the first sensor array may be operable to detect an object that is close to, but not touching, the SSDS, while the second sensor array may be operable to detect a physical touching of the SSDS that exceeds a threshold pressure. In another example embodiment, the first sensor array may be operable to detect optical radiation of a particular wavelength or that exceeds a minimum power level that strikes the surface of the SSDS, while the second sensor array may be operable to detect a physical touching of the SSDS that exceeds a threshold pressure.

While at least one example embodiment has been presented in the foregoing detailed description, it should be appreciated that a vast number of variations exist. It should also be appreciated that the example embodiment or example embodiments are not intended to limit the scope, applicability, or configuration of the invention in any way. Rather, the foregoing detailed description will provide those skilled in the art with a convenient road map for implementing the inventive aspects that may be found in at least one embodiment. The subject matter of the invention includes all combinations and subcombinations of the various elements, features, functions and/or properties disclosed in the example embodiments. It should be further understood that various changes can be made in the function and arrangement of elements without departing from the scope of the invention as set forth in the appended claims and the legal equivalents thereof.

The invention claimed is:

1. A display screen, comprising:
 a first sensor array that is operable to detect when an external stimulus that meets a first detection criteria;
 a second sensor array that is operable to detect when the external stimulus meets a second detection criteria, the second detection criteria quantitatively different from the first detection criteria, wherein the external stimulus is detectable when the external stimulus meets both the first detection criteria and the second detection criteria and when it only meets the first detection criteria; and
 a haptic feedback device coupled to the display screen which applies a first haptic feedback to the display screen in response to only the first sensor array detecting the external stimulus and which applies a second haptic feedback to the display screen, different from the first haptic feedback, in response to both the first sensor array detecting the external stimulus and the second sensor array detecting the external stimulus,
 wherein the first and second sensor arrays belong to different types, the different types selected from the group consisting of capacitive-sensitive arrays, resistive-sensitive arrays, proximity-sensitive arrays, sound-sensitive arrays and light-sensitive arrays, and
 wherein the first detection criteria comprises a first pressure that is applied against the display screen, and the second detection criteria comprises a second pressure, greater than the first pressure, that is applied against the display screen.

2. A method comprising the steps of:
 detecting a stimulus in a region of a display screen using a first sensor array of the display screen when the stimulus meets a first detection criteria;
 detecting the stimulus in the region of the display screen using a second sensor array of the display screen when the stimulus meets a second detection criteria, the second detection criteria quantitatively different from the first detection criteria, wherein the external stimulus is detectable when the external stimulus meets both the first detection criteria and the second detection criteria and when it only meets the first detection criteria;
 applying a first haptic feedback to the display screen in response to only the first sensor array detecting the stimulus; and
 applying a second haptic feedback to the display screen in response to both the first sensor array detecting the stimulus and the second sensor array detecting the stimulus,
 wherein the first haptic feedback is different than the second haptic feedback,
 wherein the first and second sensor arrays belong to different types, the different types selected from the group consisting of capacitive-sensitive arrays, resistive-sensitive arrays, proximity-sensitive arrays, sound-sensitive arrays and light-sensitive arrays, and
 wherein the first detection criteria comprises of a first pressure that is applied against the region of the display screen, and the second detection criteria comprises of a second pressure, greater than the first pressure, that is applied against the region of the display screen.

3. A display system, comprising:
 a processor;
 a display screen coupled to the processor, the display screen substantially planar;
 a first sensor network coupled to the processor, the first sensor network operable to detect when an object impinging a first plane meets a first detection criteria;
 a second sensor network coupled to the processor, the second sensor network operable to detect when the object impinging a second plane meets a second detection criteria, the second detection criteria quantitatively different from the first detection criteria, wherein the external stimulus is detectable when the external stimulus a meets both the first detection criteria and the second detection criteria and when it only meets the first detection criteria; and
 a haptic feedback device coupled to the display system which applies a first haptic feedback to the display system in response to only the first sensor network detecting the object and which applies a second haptic feedback to the display system, different from the first haptic feedback, in response to both the first sensor network and the second sensor network detecting the object,
 wherein the first and second sensor arrays belong to different types, the different types selected from the group consisting of capacitive-sensitive arrays, resistive-sensitive arrays, proximity-sensitive arrays, sound-sensitive arrays and light-sensitive arrays, and
 wherein the first detection criteria comprises of a first pressure that is applied against a surface of the display screen, and the second detection criteria comprises of a second pressure, greater than the first pressure, that is applied against the surface of the display screen.

* * * * *